Figure 3:
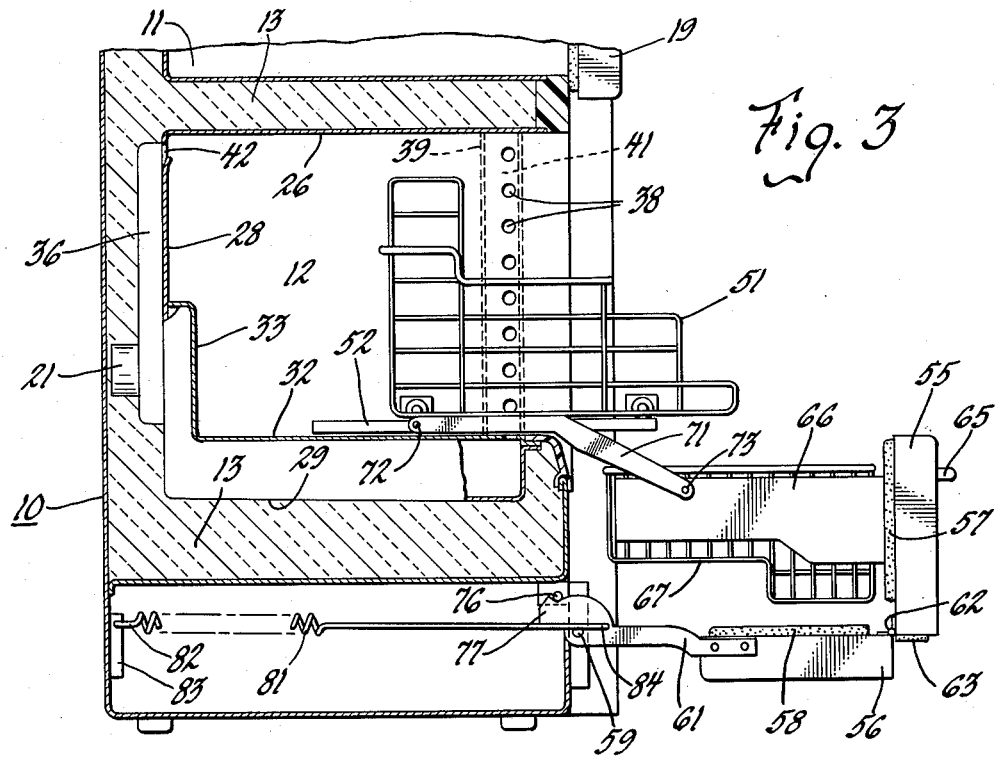

March 1, 1960 — A. J. INGOLIA — 2,926,507
REFRIGERATING APPARATUS
Filed Dec. 5, 1958 — 2 Sheets-Sheet 1

INVENTOR.
Anthony J. Ingolia
BY
HIS ATTORNEY

March 1, 1960

A. J. INGOLIA 2,926,507

REFRIGERATING APPARATUS

Filed Dec. 5, 1958

2 Sheets-Sheet 2

INVENTOR.
Anthony J. Ingolia
BY
Edwin S. Wyburg
HIS ATTORNEY

United States Patent Office 2,926,507
Patented Mar. 1, 1960

2,926,507

REFRIGERATING APPARATUS

Anthony J. Ingolia, Detroit, Mich., assignor to General Motors Corporation, Detroit, Mich., a corporation of Delaware Application December 5, 1958, Serial No. 778,398

4 Claims. (Cl. 62—377)

This invention relates to refrigerating apparatus and particularly to refrigerator cabinets wherein food products are stored in a compartment thereof and made readily accessible by removing same therefrom with the opening of the door therefor.

An object of my invention is to return frozen foods carried by a door of a freezing compartment in which the foods are stored upon closing the door after the foods have been exposed to air ambient the compartment and to position the returned food products directly in the path of a stream of cold relatively dry air circulated into the compartment whereby moisture condensed on the exposed frozen foods or packages thereof is promptly removed therefrom and the surfaces of the frozen products or their packages quickly restored to a substantially frost-free or dry condition so as to prevent bonding of the packaged foods to one another and to overcome the objection to handling frost covered food containing packages.

Another object of my invention is to provide a door arrangement for a frozen food compartment of a refrigerator cabinet which carries a portion of the total food content stored in the compartment and is constructed to be openable in a unique manner to render frozen foods supported thereon and frozen foods within the compartment readily accessible.

In carrying out the foregoing objects, it is a further object of my invention to provide a shiftable sectional closure means for the opening of a freezing or frozen food storage compartment of a refrigerator cabinet which means includes two doors one of which carries a food receiving and supporting receptacle or basket and wherein the receptacle or basket is maintained in a horizontal plane while simultaneously moving both doors to open the compartment and shift the receptacle or basket outwardly thereof and downwardly relative thereto at the front of the cabinet for facilitating accessibility to the frozen food products.

Further objects and advantages of the present invention will be apparent from the following description, reference being had to the accompanying drawings, wherein a preferred form of the present invention is clearly shown.

Figure 1:
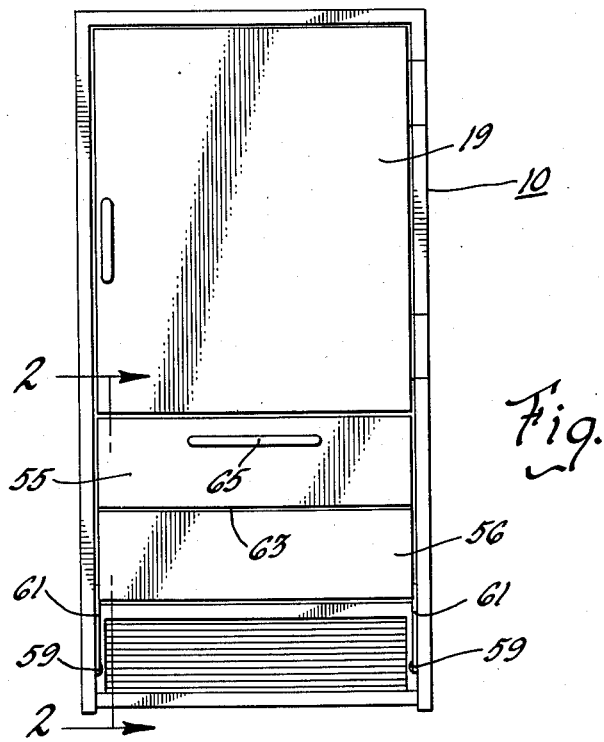
Figure 2:
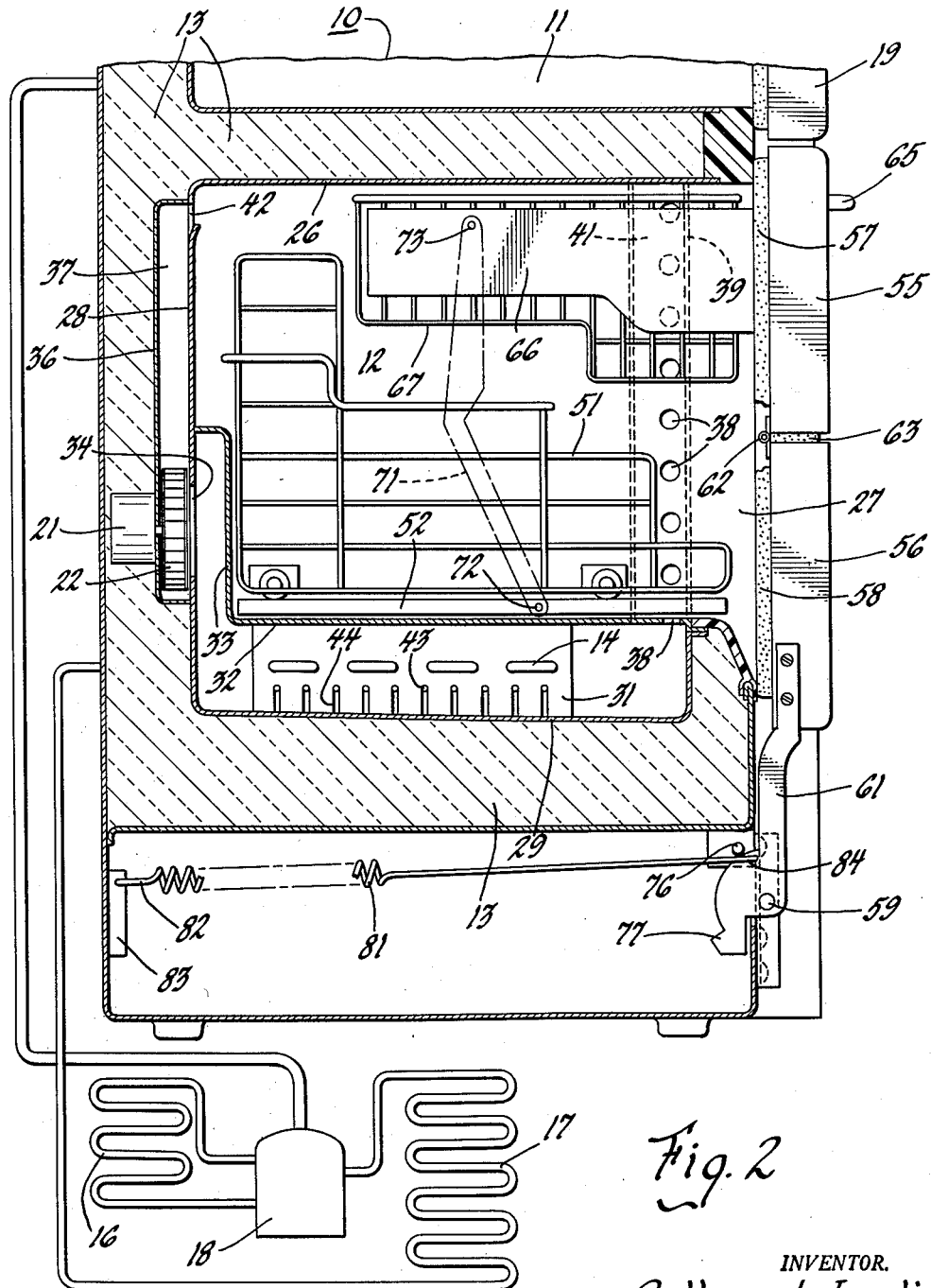

In the drawings:

Figure 1 is a front view of a multiple compartmented household refrigerator cabinet showing a closure means for a frozen food storage compartment in the lower portion of the cabinet embodying features characteristic to the present invention;

Figure 2 is an enlarged vertical fragmentary sectional view taken on the line 2—2 of Figure 1 showing a shiftable sectional closure means closing the open front frozen food storage compartment and including two doors one of which carries a food receiving and supporting receptacle or basket; and Figure 3 is a fragmentary sectional view of the refrigerator cabinet similar to Figure 2 showing the frozen food compartment closure means in open position with the food basket on one door thereof shifted outwardly of the compartment.

Referring to the drawings, I show in Figure 1 thereof a refrigerating apparatus comprising a multiple compartmented household refrigerator cabinet 10 and a refrigerating system associated therewith is diagrammatically illustrated in Figure 2 of the drawings. Cabinet 10 has a plurality of insulated walls forming an upper unfrozen food storage compartment 11 (see Figure 2) and a lower frozen food storage compartment 12 therein and isolated or insulated from one another. Insulation 13 within walls of cabinet 10 may be of any suitable or desirable material. Upper compartment 11 is cooled to a temperature above freezing such, for example, as between 37° and 43° F. by any suitable refrigerant evaporating means or evaporator (not shown) of the closed refrigerating system associated with refrigerator cabinet 10. Lower compartment 12 is cooled to a temperature well below 30° F. by another refrigerant evaporating means or finned type evaporator 14 of the refrigerating system for freezing foods, storing frozen foods and/or for freezing water in tray and grid type freezing devices into ice blocks for table use in chilling salads or the like or drinks in glsses. The evaporator for cooling compartment 11 and the finned evaporator 14 of the refrigerant system are preferably connected in series and this system also includes a refrigerant superheat removing conduit coil 16, a refrigerant condenser 17 and a motor-compressor unit 18 which are ordinarily housed in a machine compartment at the bottom of cabinet 10. An insulated door member 19 hingedly mounted on cabinet 10 for horizontal swinging movement normally closes the open front of upper compartment 11 and a separate independently operated shiftable sectional closure means, to be hereinafter described more in detail, normally closes the open front of lower compartment 12. The motor of compressor unit 18 and a motor 21 of a fan or blower 22, forming means for moving or circulating air into and out of compartment 12, are periodically energized and deenergized under the control of suitable controls such, for example, as those diagrammatically illustrated in the copending application of Leonard J. Mann, Serial No. 633,109, filed January 8, 1957 and assigned to the assignee of the present application.

Compartment 12 beneath compartment 11 includes a box-like metal liner having integral top, side and rear walls 26, 27 and 28 respectively and a bottom wall 29. Bottom wall 29 is inclined downwardly and serves to drain water out of compartment 12 to a suitable drain conduit (not shown) for a purpose to become apparent hereinafter. Wall 29 supports the vertically finned evaporator 14 with its spaced apart fins 31 extending in a direction from the front to the rear of refrigerator cabinet 10. The fins 31 on evaporator 14 in turn support a false or subbottom 32 which is provided with an integral upright rear portion 33 forming an inlet shroud for the air moving means or blower 22 located behind an aperture 34 in wall 28. Blower 22 is mounted on and driven by the shaft of motor 21. The blower or fan 22 is surrounded by a shroud 36 which is spaced from the rear wall 28 of compartment 12 to provide a discharge passage 37 therebetween. The shrouds 32 and 36 are separate from the liner of compartment 12 but are joined thereto in any suitable or conventional manner. Air is drawn from compartment 12, by blower 22, through outlet openings 38 in the front portion of the compartment walls 27 and 32, by way of a vertically disposed manifold 39 forming a passage 31 outside and along each upright side wall of the compartment, over evaporator 14 which cools the air to an extremely low temperature whereby any moisture content in the air is caused to be removed therefrom and deposited on evaporator 14. Fan or blower 22 discharges the cold relatively dry air into passage 37 and forces this air therefrom through a compartment inlet opening 42, provided in wall 28 at or near the top wall 26 of compartment 12, in a stream thereinto over and around food products or frozen food packages stored in the compartment. A sheathed electric heater 43 is located in the upper portion of notches 44 provided in the fins 31 of evaporator 14 and this heater is energized automatically by a timed or timer control to periodically say, for example, once each day defrost evaporator 14. In this manner the frost or ice on evaporator 14 is removed therefrom and flows out of the refrigerator cabinet by way of a suitable drain or drains. The extreme low temperatures of evaporator 14 and the air circulation thereover and around or over wrapped or packaged food products in compartment 12 are utilized to maintain surfaces of the packages of food substantially free of frost or ice by sublimating same therefrom onto the evaporator. The arrangement for refrigerating the interior of compartment 12 is similar to that disclosed and more fully described in the copending application hereinbefore referred to and in the copending application of L. J. Mann and Edward C. Simmons, Serial No. 725,652, filed April 1, 1958, which latter application is also assigned to the assignee of this application.

In the use of a refrigerator having a freezing or frozen food compartment of the type herein disclosed wherein the packaged food products are stored and maintained substantially dry in a frost-free or frost-proof freezer and are occasionally removed therefrom and exposed to air ambient the refrigerator, it is highly desirable to insure that the exposed food products when returned to the freezing compartment will be positioned directly in the path of cold dry air circulated into the compartment. To this end and in order to render all food products within compartment 12 easily examinable and readily accessible, I provide a shiftable sectional closure means for closing the open front of frozen food storage compartment 12 which means includes or comprises an isulated top section or door 55 and an insulated bottom section or door 56 each carrying a gasket 57 and 58 respectively on their inner face for sealingly engaging walls of cabinet 10 at the front of compartment 12. The lower portion of bottom door 56 is pivotally mounted upon cabinet 10 as at stud 59 by brackets 61 rigidly secured to opposite side edges of this door. The upper portion of bottom door 56 is hingedly mounted by a piano-like hinge 62 to the lower portion of top door 55. A gasket 63 is secured in any suitable or conventional manner to an edge portion of one of the door sections, preferably door 55, for engagement between the doors 55 and 56 to sealingly close the movable joint therebetween. Top door 55 is provided with a handle 65 to facilitate movement of the shiftable sectional closure means and any suitable or conventional latching mechanism (not shown) may, if found necessary or desirable, be employed to hold the closure means, doors 55 and 56, shut in sealing engagement with cabinet 10. Top door 55 has a pair of spaced apart arms 66 rigidly and stationarily secured thereto so as to extend from the inner face thereof which arms support a reticulated receptacle support or wire basket 67 thereon. Support or basket 67 normally projects from door 55 into compartment 12 and is located in a predetermined position in the upper portion of the compartment opposite its air inlet opening 42 (see Figure 2) so as to be directly in the path of a stream of cold relative dry air circulating thereinto. A leverage mechanism links top door 55 to walls of cabinet 10 within compartment 12 for movement relative to the cabinet. This mechanism includes a pair of spaced apart lever arms 71 each having an end pivotally mounted as by a stud or the like 72 to cabinet 10 with its other end swingably or hingedly secured or mounted by a stud or the like 73 to one of the arms 66 on door 55. Lever arms 71 cooperate with the mountings of door 56 to at all times maintain door 55 and support or basket 67 thereon in a horizontal plane. A rigid stop means of any suitable form or construction may be provided for stopping the opening movement of the shiftable sectional closure means of compartment 12. By way of example, rigid studs 76 can be securely mounted on sides of cabinet 10 for cooperation with and adapted to be engaged by a lug 77 formed on each of the brackets 61 on bottom door 56 to provide such a stop means. Any conventional or well-known counterbalancing mechanism or device may be associated with the sectional closure means to counterbalance movements thereof. For illustrative purpose, large coil springs 81 having their one end 82 anchored upon a bracket 83 rigidly secured to cabinet 10 with their other end 84 locked in an aperture provided in the door brackets 61 may serve as the counterbalancing mechanism. I also provide in compartment 12 a movable wire or the like food storage receptacle or basket generally represented by the reference numeral 51. This basket 51 may be of any desired shape or form and is mounted within compartment 12 on a pair of extensible devices indicated at 52. Devices 52 should be of a type to permit basket 51 to be rolled and/or slid part way out of compartment 12 while supported therefrom and they are preferably of the character disclosed and fully described in Patent No. 2,724,630 to O. V. Saunders, dated November 22, 1955. The supports or baskets 51 and 67 together with frozen food products thereon or therein normally occupy the major portion of the interior of freezing compartment 12 of cabinet 10.

When a force is applied to handle 65 of the closure means for compartment 12, upon unlaching this means if a latch mechanism is employed therefor, lever arms 71 guide support or basket 67 and top door 55 outwardly away from cabinet 10 and downwardly relative thereto at its front. During this movement, basket or support 67 is held in horizontal planes while door 55 shifts continuously in vertical planes substantially paralleling the front of compartment 12. The movement of top door 55 swings the bottom door 56 about its pivotal mountings whereby both doors 55 and 56 are simultaneously lowered until the lugs 77 on door brackets 61 strike the studs 76 to support the sectional closure means of compartment 12 in a fully open position as shown in Figure 3 of the drawings. This in addition to removing frozen food products contained in basket 67 from compartment 12, for rendering them readily accessible at the front of cabinet 10, also exposes the products to air ambient the refrigerator cabinet. At this time frozen food products carried by basket 51 can, by virtue of the slidable and extensible supports 52 therefor, be shifted outwardly of compartment 12 to render the foods in basket 51 more easily accessible. Due to the low temperature of food products on support or basket 67 while exposed to air ambient the refrigerator cabinet causes moisture of the ambient air to condense on and wet surfaces of packages containing the food. Since it is desired to store the food product packages in a dry substantially frost-free condition, it follows that it is also desirable and essential to such storage that moisture accumulated on the packages be promptly removed therefrom upon returning support or basket 67 into compartment 12. This closing of the closure means, doors 55 and 56, shifts basket 67 into its normal predetermined position within the upper portion of compartment 12 opposite and in horizontal alignment with the compartment air inlet opening 42. Basket 67 is thereby directly relocated in the stream of relatively dry cold air egressing from opening 42 which air flows over and around the moistened surfaces of the food packages to absorb the moisture condensed thereon while same were exposed outside compartment 12. The moisture is carried by the circulated air through the compartment outlet openings 38 and is withdrawn from circulating air as the air flows over evaporator 14 and is deposited on the evaporator. This is sublimating the moisture which collects in the form of frost or ice on evaporator 14 and is thereafter defrosted therefrom and directed out of communication with air in the freezing or frozen food storage compartment.

From the foregoing, it should be apparent that I have in addition to providing a way to insure prompt removal of moisture from surfaces of frozen food products, after they have been exposed to air outside a storage compartment therefor, also provided a novel closure means for the compartment which carries and renders food products supported thereon readily accessible exteriorly of and at the front of a refrigerator cabinet. My food supporting arrangement in a frozen food storage compartment of a refrigerator cabinet provides an improved refrigerating apparatus wherein the utility of handling, selecting and removing frozen foods therefrom or of placing foods therein is increased. My door supported frozen food basket together with the rollable, slidable or extensible basket and the cooperation therewith of the shiftable closure means for the frozen food compartment which opens the compartment for access to both baskets provides a means for selectively removing frozen food products from the batch thereof in the outwardly shifted basket and/or from the batch of food products stored within the compartment on the extensible basket. The design and movability of the frozen food compartment closure means permits the user of the refrigerator to stand closer to the refrigerator cabinet while the open position of the closure means occupies a minimum amount of walking space adjacent to or at the front of a refrigerator in a close or limited floor area kitchen.

While the form of embodiment of the invention as herein disclosed constitutes a preferred form, it is to be understood that other forms might be adopted, as may come within the scope of the claims which follow.

What is claimed is as follows:

1. A refrigerating apparatus comprisng in combination, a cabinet having walls forming an open front food storage compartment therein, a refrigerating system associated with said cabinet including an evaporator for cooling food products stored in said compartment to a temperature well below 32° F., said compartment being provided with air inlet and air outlet openings in wall thereof, air moving means within said cabinet for circulating air over said evaporator into and out of the compartment through said openings, said air inlet opening being near the top wall of said compartment, a shiftable sectional closure means normally closing the open front of said compartment, said sectional closure means including a top door and a bottom door, the lower portion of said bottom door being pivotally mounted upon said cabinet and having its upper portion hingedly mounted to the lower portion of said top door, lever arms movably linking said top door to walls of said cabint, a reticulated frozen food product receiving and storing receptacle on said top door projecting into said compartment at a predetermined position therein opposite said air inlet opening in the path of cold dried air egressing therefrom, said lever arms being constructed and arranged to guide said top door, when force is applied to the closure means, outwardly away from said cabinet and downwardly relative thereto continuously in vertical planes substantially paralleling the front of said compartment to at all times maintain said receptacle in a horizontal plane and to expose frozen food products therein to air ambient the refrigerator cabinet, said bottom door being swung about its said mountings by said movement of the top door whereby both dors are simultaneously lowered to provide access to the interior of said compartment and to frozen food products in said receptacle, the low temperature of the exposed frozen food products causing moisture in the air ambient said cabinet to condense on the products, and said receptacle being, upon closing said closure means, returnable to said predetermined position within said compartment to thereby subject the moisture on the food products directly to the stream of cold dried air egressing from said compartment air inlet opening for prompt removal therefrom.

2. A refrigerating apparatus comprising in combination, a cabinet having walls forming an open front food storage compartment therein, a refrigerating system associated with said cabinet including an evaporator for cooling food products stored in said compartment, a shiftable sectional closure means normally closing the open front of said compartment, said sectional closure means including a top door and a bottom door, the lower portion of said bottom door being pivotally mounted upon said cabinet and having its upper portion hingedly mounted to the lower portion of said top door, lever arms movably linking said top door to walls of said cabinet, a gasket seal on one of said doors and engageable therebetween, a food product receiving and storing support on said top door projecting laterally from the inner face thereof into said compartment at a predetermined position therein, said lever arms being constructed and arranged to guide said top door, when force is applied to the closure means, outwardly away from said cabinet and downwardly relative thereto continuously in vertical planes substantially paralleling the front of said compartment to at all times maintain said support in a horizontal plane, and said bottom door being swung about its said mountings by said movement of the top door whereby both doors are simultaneously lowered to provide access to the interior of said compartment and to food products on said support.

3. A refrigerating apparatus comprising in combination, a cabinet having insulated walls forming an open front food storage compartment therein, a refrigerating system associated with said cabinet including an evaporator for cooling food products stored in said compartment to a temperature well below 32° F., said compartment being provided with an air inlet opening at the back thereof near its top wall and a plurality of air outlet openings spaced therefrom and located near the front of the compartment, a blower in said cabinet for circulating air over said evaporator into and out of the compartment through said openings, a shiftable sectional closure means normally closing the open front of said compartment, said sectional closure means including a top door and a bottom door, the lower portion of said bottom door being pivotally mounted upon said cabinet and having its upper portion hingedly mounted to the lower portion of said top door, a food product receiving and storing support rigidly secured to said top door projecting into said compartment at a predetermined position therein opposite and in horizontal alignment with said air inlet opening in the path of cold dried air egressing therefrom, a leverage mechanism movably linking said door to a wall of said cabinet, said mechanism including an arm having one end thereof pivotally attached to said cabinet with its other end hingedly connected to a part of the support on said top door, said linking of the top door to said cabinet by said leverage mechanism being such that said arm thereof guides said top door, when force is applied to the closure means, outwardly away from said cabinet and downwardly relative thereto continuously in vertical planes substantially paralleling the front of said compartment to at all times maintain said support in a horizontal plane and to expose frozen food products thereon to air ambient the refrigerator cabinet, said bottom door being swung about its said mountings by said movement of the top door whereby both of said doors are simultaneously lowered to provide access to the interior of said compartment and to frozen food products on said support, the low temperature of the exposed frozen food products causing moisture in the air ambient said cabinet to condense on surfaces of the products, and said support being, upon closing said closure means, returnable to said predetermined position within said compartment to thereby subject the moisture on food products supported on said support directly to the stream of cold dried air egressing from said compartment air inlet opening for prompt removal therefrom.

4. A refrigerating apparatus comprising in combination, a cabinet having walls forming an open front food compartment therein, a refrigerating system associated with said cabinet including a refrigerant evaporator for cooling foods in said compartment, a shiftable sectional closure means normally closing the open front of said compartment, said closure means including a top door and a bottom door, the lower portion of said bottom door being pivotally mounted upon walls of said cabinet and having its upper portion hingedly attached to the lower portion of said top door, lever arms movably linking said top door to said cabinet, a food product receiving and storing support on said top door projecting laterally from the inner face thereof into the upper part of said compartment, a food product receiving and storage receptacle movably supported in said compartment below said food support on said top door and adapted to be extended part way of the compartment, said lever arms being constructed and arranged to guide said top door, when force is applied to the closure means, outwardly away from said cabinet and downwardly relative thereto continuously in vertical planes substantially paralleling the front of said compartment to at all times maintain said support in a horizontal plane, said bottom door being swung about its said mounting by the movement of said top door whereby both doors are simultaneously lowered to position said food support on said top door below the level of said food storage receptacle and for providing access to the interior of said compartment, and said food storage receptacle being movable outwardly of said compartment while supported from within same over a portion of said lowered food support into a readily accessible position at the front of said cabinet.

References Cited in the file of this patent
UNITED STATES PATENTS

| | | |
|---|---|---|
| 2,125,989 | Burch | Aug. 9, 1938 |
| 2,149,114 | Constantine | Feb. 28, 1939 |
| 2,537,363 | Minor | Jan. 9, 1951 |
| 2,776,866 | Harbison | Jan. 8, 1957 |